Sept. 27, 1932. A. WOLLENSAK ET AL 1,879,650
APPARATUS FOR REPRODUCING SOUND FROM PHOTOGRAPHIC RECORDS
Filed Aug. 29, 1930 3 Sheets-Sheet 1
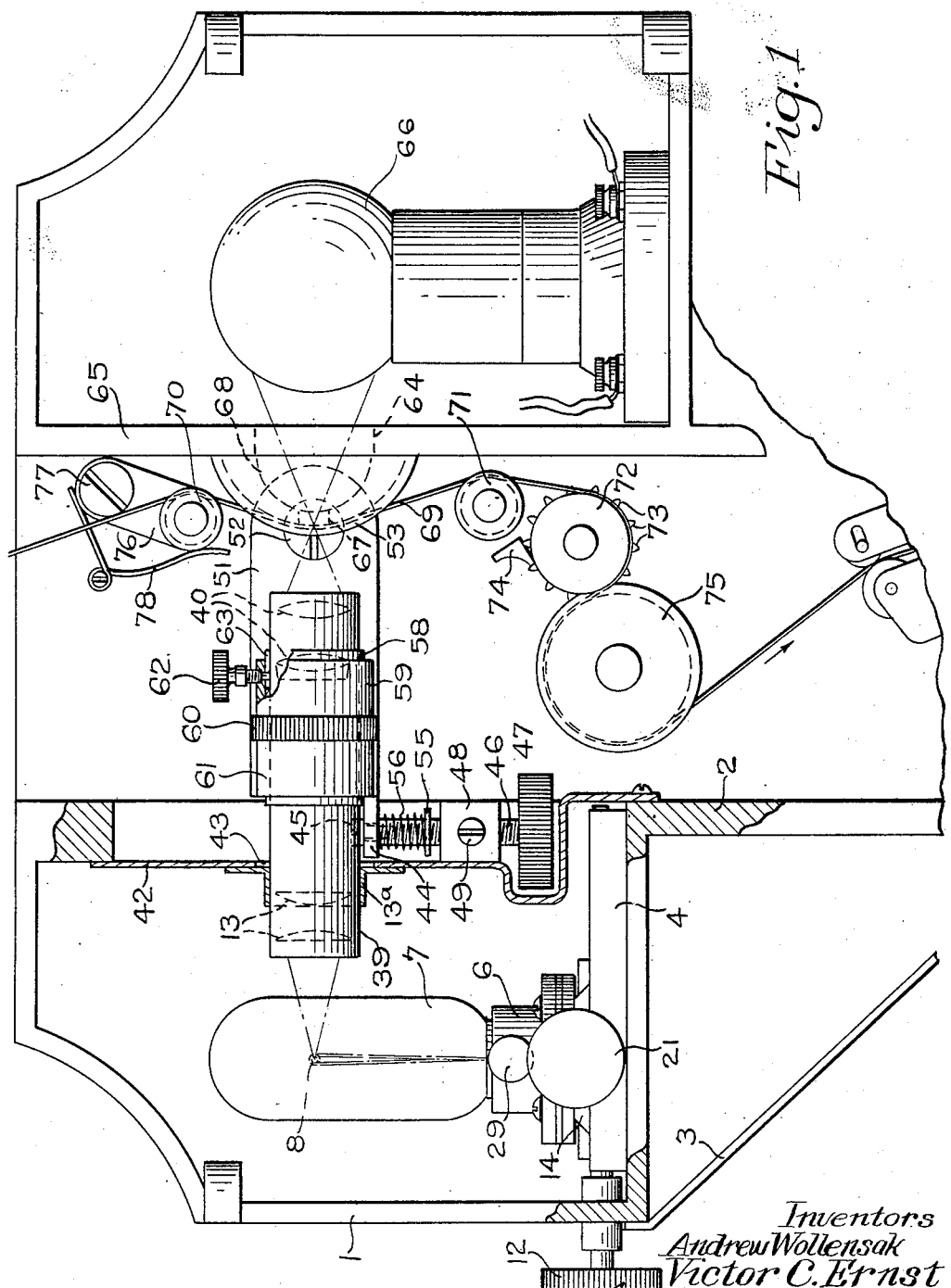
Inventors
Andrew Wollensak
Victor C. Ernst
BY Harold E. Stonebraker
their ATTORNEY

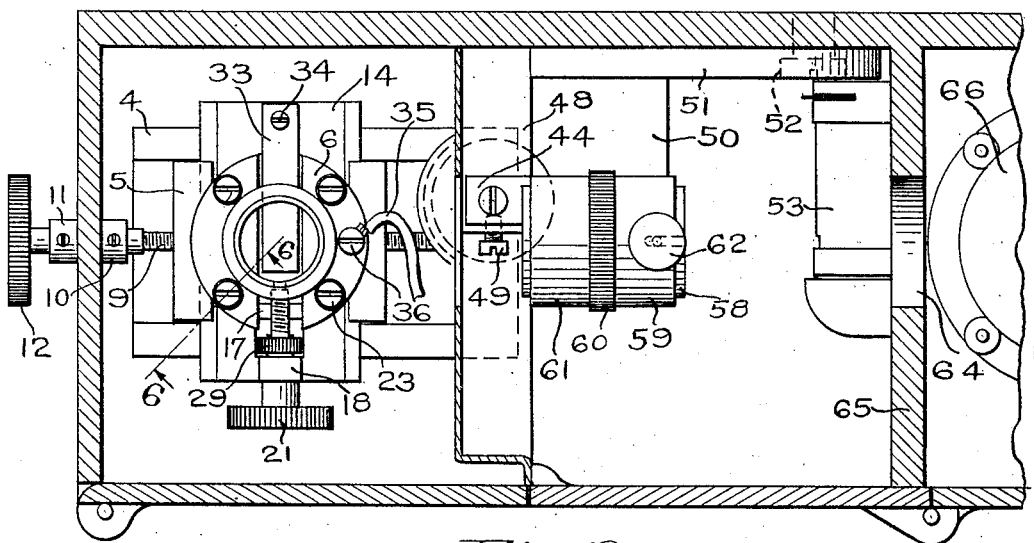
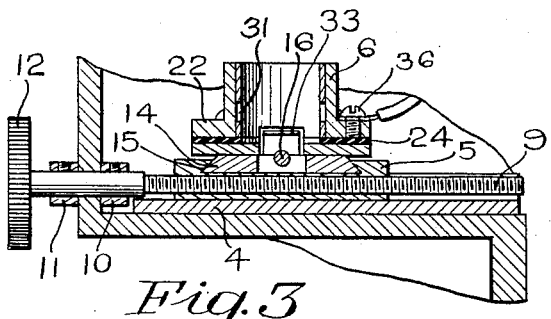
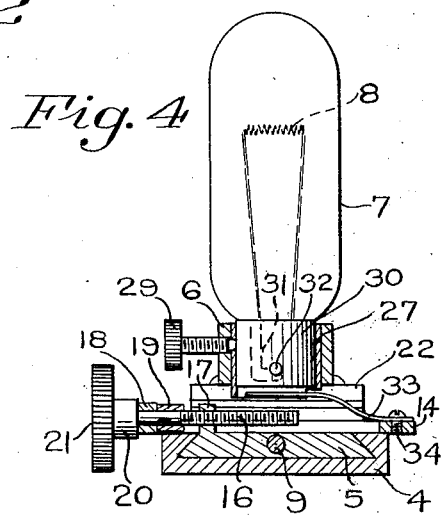
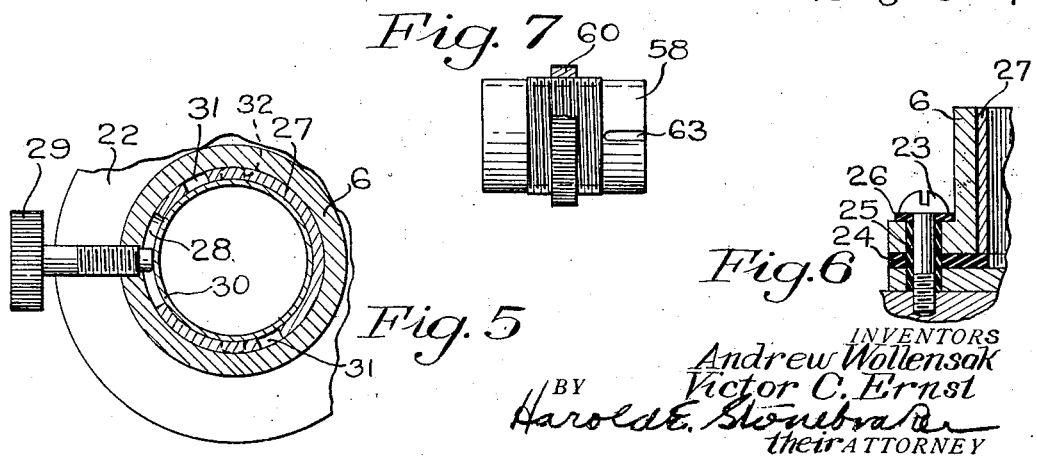
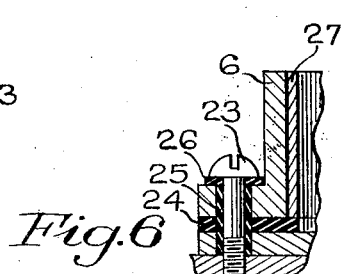

Sept. 27, 1932. A. WOLLENSAK ET AL 1,879,650
APPARATUS FOR REPRODUCING SOUND FROM PHOTOGRAPHIC RECORDS
Filed Aug. 29, 1930   3 Sheets-Sheet 3
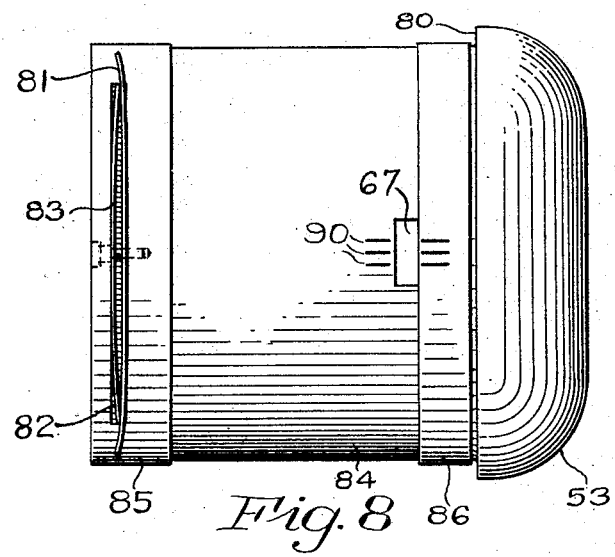
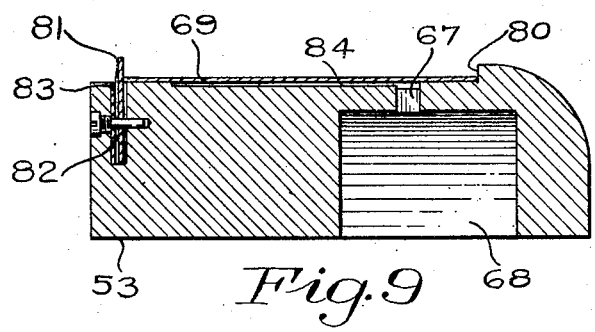
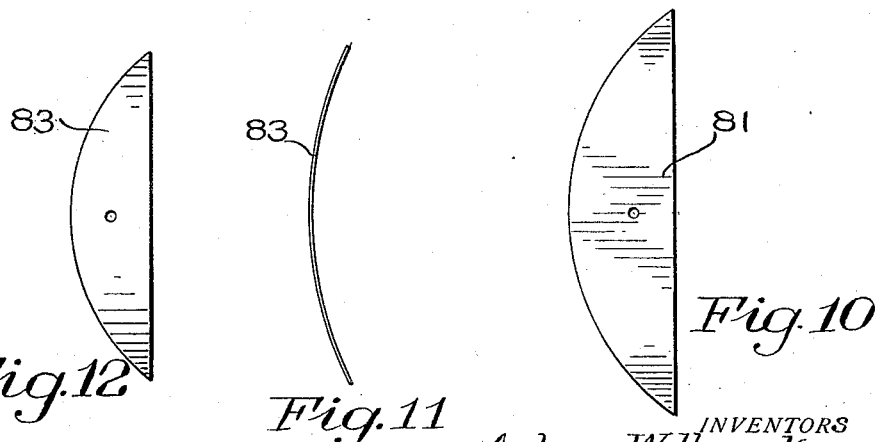
INVENTORS
Andrew Wollensak
Victor G. Ernst
BY Harold E. Stonebraker
their ATTORNEY Patented Sept. 27, 1932

1,879,650

UNITED STATES PATENT OFFICE

ANDREW WOLLENSAK AND VICTOR C. ERNST, OF ROCHESTER, NEW YORK, ASSIGNORS TO FULL TONE REPRODUCTION CO., OF ROCHESTER, NEW YORK, A CORPORATION OF OHIO

APPARATUS FOR REPRODUCING SOUND FROM PHOTOGRAPHIC RECORDS

Application filed August 29, 1930. Serial No. 478,644.

This invention relates to improvements in reproduction of sound, and particularly to apparatus for reproducing sound from photographic records, such as a talking moving picture film.

The principal object of the invention is to provide an apparatus of this kind which is simple and inexpensive to make and in which only a few simple adjustments are required for properly alining the lens system with the lamp or other source of light and a light sensitive cell.

Another object of the invention is to provide an improved guide for the film which permits free movement of the film and which is so constructed that the light sensitive cell may be adjusted into close relation to the record on the film, thus securing a clearer enunciation of the tone.

To these and other ends, the invention consists in the construction and arrangement of parts that will appear from the following description when read in conjunction with the accompanying drawings, the novel features being pointed out in the claims at the end of the specification.

In the drawings:

Fig. 1 is a longitudinal vertical section of a sound reproducing apparatus constructed according to one embodiment of the invention, parts being broken away to conserve space;

Fig. 2 is a longitudinal horizontal section of the same, some of the parts being removed and others shown in different positions;

Fig. 3 is a fragmentary detail view of means for adjusting the lamp;

Fig. 4 is a detail sectional view of the lamp and its mounting;

Fig. 5 is a fragmentary sectional view showing devices for securing the lamp in proper angular adjustment;

Fig. 6 is a fragmentary detail sectional view taken substantially on line 6—6 of Fig. 2 and showing how the lamp socket is mounted;

Fig. 7 is a fragmentary detail view of devices for focusing the objective lens;

Fig. 8 is a front elevation of the film guide;

Fig. 9 is a horizontal section of the same;

Fig. 10 is a side elevation of a member for guiding one edge of the film;

Fig. 11 is a front elevation of a spring or resilient member which engages the film guiding member, and Fig. 12 is a side elevation of the same.

Referring specifically to the drawings, in which like reference numerals refer to the same part in all the views, 1 is a lamp housing constructed of suitable material and projecting forwardly from a suitable support 2. A brace 3 may be arranged between the support and the front of the lamp housing for supporting the front of the latter. Mounted in the bottom of the lamp housing is a dovetail guideway 4, see Fig. 4, in which a longitudinally movable carriage 5 is slidably mounted and on which a lamp socket 6 which receives a lamp 7 of a kind well known in the art is carried, and which has a filament 8 arranged in a substantially horizontal plane.

Manually operated means are provided for imparting fine longitudinal adjustments to the carriage 5 in the giudeway 4. Said means comprises a threaded rod or shaft 9, see Fig. 3, revolubly mounted in the front wall of the housing 1 and threaded in a tapped opening in the base of the carriage 5. A pair of collars 10 and 11 secured to the shaft on opposite sides of the front wall secure the shaft against longitudinal movement therein. A knurled fingerpiece 12 is secured to the outer end of the shaft for manually operating the same. Rotation of the fingerpiece 12 in one direction or the other moves the carriage 5 and with it the lamp toward and from the condensing lenses 13 mounted in a tube projecting from the rear wall of the lamp housing.

Means are also provided for adjusting the lamp 7 transversely of the condensing lenses. To this end, the lamp socket 6 is mounted on a second carriage 14 slidably mounted in dovetail guideways 15 on the carriage 5. A screw 16 is threaded in a tapped opening in a lug 17 on the carriage 5 and projects into a groove provided therefor in the bottom of the carriage 14. The screw 16 has a bearing in a lug 18 on the carriage 14, and a collar 19 secured to the screw engages one side of said lug, and a second collar 20 on a knurled fingerpiece 21 on the end of the screw engages the outer side of the lug 18. By this construction, rotation of the screw 16 in one direction or the other operates to move the carriage in one direction or the other through the lug 17 in which it is threaded.

The lamp socket 6 is mounted on the carriage 14 by any suitable means. In the embodiment illustrated, the lamp socket has an annular flange 22 at its base whereby it is secured to the carriage by means of headed screws 23 secured in tapped openings in the carriage. The socket is insulated from the carriage by an insulating member 24 and the screw is insulated by a bushing 25 and washer 26, as shown in detail in Fig. 6. It is desirable that the filament 8 of the lamp be at all times arranged in a plane at substantially right angles to the axis of the lens system, and since the arrangement of the filament with respect to the base of the lamp is not uniform in all lamps, provision is made herein for mounting the lamp adjustably in its socket 6. To this end, a bushing 27 is arranged in the socket and at one side is provided with a slot 28 through which the inner end of a thumbscrew 29, threaded in the outer wall of the socket, projects into engagement with the base 30 of the lamp and secures it in frictional engagement with the opposite inner wall of the lamp socket, the opposite wall of the bushing 27 being clamped between the base of the lamp and the inner wall of the lamp socket, see Fig. 5. By turning the thumb screw to disengage it from the base of the lamp, the lamp is free to turn with the bushing 27 about its axis as a center until the filament 8 is in proper relation to the lens system, when the screw can be turned in the opposite direction to secure the lamp in the adjusted position.

The bushing 27 is provided with a bayonet slot 31 with which a pin or stud 32 projecting from the base of the lamp cooperates to retain the lamp in the socket, with its contact point resiliently engaged by a resilient contact 33 secured at 34 to the carriage 14 by means of a screw or other convenient means. The grounded terminal 35 is secured to a binding post 36 on the flange 22 of the lamp socket.

Referring to Figs. 1 and 2, it will be noted that the lens system is carried in a bracket 50 projecting inwardly from an arm 51 which extends rearwardly in contact with one of the vertical side walls to which it is pivoted by means of a headed screw 52 to swing about an axis passing through the slit or opening in the film guide 53. The lens system comprises a condensing lens or group 13 and a projection group or lens 40 mounted in a tube 39 adjustable in said bracket.

The lens tube 39 projects forwardly through an opening in the rear wall of the lamp housing and through a vertically elongated opening 43 in a cover 42 which closes said opening in the wall. The bracket 50 has a forwardly projecting lug 44 which has an opening therein in which the upper end of a micrometer screw 46 is received. The screw 46 is threaded in an opening in a block or projection 48 mounted on a fixed part and has a tapped lateral opening in which a set screw 49 is arranged for securing the screw 46 in adjusted position. A collar 55 is secured to the screw, and arranged between this collar and the lug 44 is an expansion coiled spring 56 which tends to move the lug 44 upwardly on the bolt against the head of a screw 45 threaded into a tapped opening arranged axially in the end of the screw. Rotation of the screw 46 in one direction moves it bodily upward in the supporting lug 48 and swings the front end of the lens system upwardly in the opening 43 and relatively to the lamp filament about the slit or opening in the film guide as a center.

Since the threads on the micrometer screw 46 are very small, very fine adjustments are possible, the spring 56 being operative to assure movement of the lens tube with the screw. Rotation of the screw in the other direction moves it downward in the lug 48 and swings the lens system downwardly. When the lens system is properly adjusted with respect to the lamp filament, the screw may be locked in its adjusted position by means of the set screw 49. A flanged thimble 13ᵃ may be frictionally mounted on the tube 39 with its flange in engagement with the wall 42 to seal the opening 43 around the tube 39.

The lens tube 39 is slidably mounted in an adjusting or focusing tube 58 and frictionally retained therein. The focusing tube 58 is arranged in a pair of spaced tubular members 59 and 61 on the bracket 50 and is externally threaded for cooperation with an internally threaded ring 60, see Fig. 7, arranged between the tubular members 59 and 61. A set screw 62 threaded in a tapped opening in the tubular member 59 engages a groove 63 arranged parallel with the axis of the tube 58 in its outer wall and prevents rotation of said tube in the tubular member. The ring 60 has its outer periphery knurled for manual engagement whereby it may be turned in one direction or the other for adjusting the tube 58 and with it the lens system micrometer distances toward and from the film guide 53 or the lamp 7, when the set screw 62 may be turned into engagement with the bottom of the groove 63 to retain the tube 58 in its adjusted position.

The film guide 53 is mounted in front of an opening 64 in a wall 65 to the rear of which is arranged a photo-electric cell 66 of any usual or well known type that is capable of reacting to slight variations in the intensity of light produced by the record on the film, which variations are converted into sound by an audio-frequency amplifier and telephone receiver or loud speaker. The film guide preferably has a cylindrical or curved surface on its front wall which has a narrow slot 67, previously referred to, in front of a hollow or cut-out portion 68 of the guide and arranged in alinement with the axis of the lens system and the photo-electric cell. The film guide is arranged in the path of a strip of film 69 such as used in moving pictures or other well known form of film, previously exposed to light controlled by sound variations and developed in the usual manner to produce an image or record on the film of the sound variations, in a manner well known in the art. Such a sound record may be produced on a moving picture film in a narrow belt or line longitudinally of the film and laterally of the picture record. The film which may be in the form of a long or endless strip is fed over the roller 70 from a source of supply, such as a spool. From the roller 70 it passes over the film guide 53 to an idler 71, thence to a driven roller 72 having projections 73 which engage the usual openings provided therefor in the film and insures an even parallel movement thereof. From the roller 72, the film passes over a roller 75 and from thence to the usual or preferred devices for guiding it to a receiving spool or other receptacle. The usual stripper 74 is associated with the roller 72 for stripping the film therefrom in case of fracture. The roller 70 is mounted on an arm 76 pivoted at 77 on a fixed part, and is resiliently engaged by a spring 78 which presses it rearwardly toward the film, and insures a substantially uniform pressure on the film between the rollers 70 and 71 and over the film guide.

The rollers 70 and 71 between which the film passes over the film guide have their peripheries arranged to the rear of a vertical plane tangent to the film guide so that a considerable area of the film engages the film guide. The slit or opening 67 is arranged in the path of the sound record on the film and in the optical axis of the lens system. The film is guided laterally on the guide to maintain its sound record in alinement with the opening 67 by means of a shoulder 80 which engages one side of the film and against which the film is resiliently maintained by means of a guide 81, shown in detail in Fig. 10, and mounted in a slot 82 provided therefor in the guide and arranged to engage the other side of the film.

The ends of the guide are bent or curved outwardly to permit free movement of the film without danger of injuring the same. The guide 81 is of substantially the shape of the surface of the film guide so that it projects a substantially uniform distance above its surface from the slot in which it is secured by means of a screw threaded in an opening in the film guide and projecting through an opening in the guide plate, as clearly shown in Fig. 9. The slot 82 is wider than the thickness of the guide plate to provide for a spring 83 arranged in the slot and resiliently engaging the guide plate to press it toward and into engagement with the side edge of the film. The spring 83 is a relatively weak one so that it does not impose sufficient tension on the film to cause buckling or strains which might result in injury thereto. The spring 83 is of the form shown in Figs. 11 and 12 and engages the guide plate 81 at its ends and the inner wall of the slot at a point at or adjacent its middle, as shown in Fig. 8. The spring is of such a size that its outer edge lies flush with the surface of the film guide in which it is secured by the screw which secures the guide plate therein.

The film normally moves quite rapidly over the guide 53 and in order to prevent friction between it and the guide which might result in injury to it or its record, means are provided for separating its surface from the guide throughout the greater portion of its width. To this end, that surface of the guide which lies beneath the record portion of the film is cut away throughout the greater portion of its width at 84, forming a depressed portion between two elevated portions 85 and 86. The elevated portions 85 and 86 are adapted to engage narrow portions of the film at or adjacent its lateral edges which ordinarily do not carry the photographic record. Such elevated portions which are engaged by the film are or may be highly polished to reduce friction to a minimum.

The lens system is operative to reduce the image of the lamp filament to a band of microscopic width which engages the photographic sound record on the film and projects it through the slot 67 on the light sensitive cell in rear of the film, or in other words, the record on the film intercepts the passage of the light therethrough and varies its intensity, which variations are converted by the cell and receiver into audible sound.

In order to facilitate the adjustment of the band of light from the lens system to the slit in the film guide, an indicator 90 may be provided on the film guide to indicate the proper position of the image with respect thereto.

It will be noted that the lamp is rigidly supported and has but two adjustments which may be fixed when first assembled, since no further adjustment of the support will be required unless a lamp having a different size filament is employed. In the arrangement described, the photo-electric cell may be mounted very closely to the film guide, whereby undulations of the sound record on the film may be clearly projected thereon, resulting in a clear tone of good volume.

Although only one embodiment of the invention is shown and described herein, it will be understood that this application is intended to cover such changes or modifications as come within the spirit of the invention or scope of the following claims.

We claim:

1. In an apparatus for reproducing sound from a photographic record thereof, the combination of a guide for a movable film having a sound record thereon and an aperture in said guide arranged behind the path of the sound record, a lamp, a filament in said lamp, a lens system for focusing a reduced image of the filament on the sound record, an arm pivoted to swing in a vertical plane in which said lens system is carried, means for adjusting said arm to swing the lens system into vertical alinement with said filament, and means for converting the light rays projected through said aperture into sound.

2. In an apparatus for reproducing sound from a photographic record thereof, the combination of a guide for a movable film having a sound record thereon and an aperture in said guide arranged behind the path of the sound record, a lamp, a filament in said lamp, a lens system for focusing a reduced image of the filament on the sound record, an arm pivoted to swing in a vertical plane about an axis passing through the aperture in the film guide and in which the lens system is carried, means for adjusting said arm to swing the lens system into vertical alinement with said filament, and means for converting the light rays projected through said aperture into sound.

3. In an apparatus for reproducing sound from a photographic record thereof, the combination of a guide for a movable film having a sound record thereon and an aperture in said guide arranged behind the path of the sound record, a lamp, a filament in said lamp, a lens system for focusing a reduced image of the filament on the sound record, an arm pivoted at one end to swing in a vertical plane about an axis passing through the aperture in the film guide and in which the lens system is carried, a micrometer screw secured to the other end of said arm and mounted in a fixed part for adjusting the lens system into vertical alinement with said filament, and means for converting the light rays projected through said aperture into sound.

4. In an apparatus for reproducing sound from a photographic record thereof, the combination of a guide for a movable film having a sound record thereon and an aperture in said guide arranged behind the path of the sound record, a lamp, a filament in said lamp, a lens system for focusing a reduced image of the filament on the sound record, an arm pivoted at one end to swing in a vertical plane about an axis passing through the aperture in the film guide and in which the lens system is carried, a micrometer screw secured to the other end of said arm and mounted in a fixed part for adjusting the lens system into vertical alinement with said filament, a spring on said screw and arranged between a fixed part thereof and said arm, and means for converting the light rays projected through said aperture into sound.

5. In an apparatus for reducing sound from a photographic record thereof, the combination of a guide for a movable film having a sound record thereon and an aperture in said guide arranged behind the path of the sound record, a lamp, a filament in said lamp, a lens system for focusing a reduced image of the filament on the sound record, said lens system comprising a tube, a support for said lens system, a sleeve on said support, a threaded tube slidable in said sleeve and in which the lens tube is slidably mounted, a fingerpiece threaded on the threaded tube and fixed against movement relatively to the support for adjusting the threaded tube and tube mounted therein toward and from the film guide, means for securing the threaded tube in adjusted position, and means for converting the light rays projected through said aperture into sound.

6. In an apparatus for reproducing sound from a photographic record thereof, the combination of a source of light, a film guide having an aperture therein and comprising a convex surface for guiding a film having a sound record thereon in a curvilinear path over said aperture and a slot arranged at one side of said convex surface, a shoulder at the other side of said convex surface adapted to engage one side edge of said film, a guide member arranged in said slot and projecting therefrom, means also arranged in said slot for resiliently pressing said guide member into engagement with the other side edge of the film, means for directing a reduced image of the light through the sound record on the film and the aperture in the guide, and means arranged behind the film guide for converting the light rays projected through said aperture into sound.

In witness whereof, we have hereunto signed our names.

ANDREW WOLLENSAK.
VICTOR C. ERNST.